United States Patent [19]
Torii et al.

[11] Patent Number: 5,517,416
[45] Date of Patent: May 14, 1996

[54] TRACTION CONTROLLER FOR CRAWLER VEHICLES

[75] Inventors: Tetsuo Torii; Kimihiko Takagi; Tomoo Matsuda; Shigeru Honda; Takuya Sakamoto; Soichi Nakamura, all of Hiratsuka, Japan

[73] Assignee: Kabushiki Kaisha Komatsu Seisakusho, Tokyo, Japan

[21] Appl. No.: 318,872

[22] PCT Filed: Apr. 20, 1993

[86] PCT No.: PCT/JP93/00507

§ 371 Date: Oct. 18, 1994

§ 102(e) Date: Oct. 18, 1994

[87] PCT Pub. No.: WO93/21053

PCT Pub. Date: Oct. 28, 1993

[30] Foreign Application Priority Data

Apr. 21, 1992 [JP] Japan .................... 4-101348

[51] Int. Cl.$^6$ ................................ B62D 55/065
[52] U.S. Cl. ............... 364/424.07; 364/426.03; 180/9.5; 180/8.2; 180/8.7
[58] Field of Search .......... 364/424.07, 424.01, 364/424.05, 426.01, 426.03; 180/6.7, 9.1, 9.21, 9.5, 9.62, 8.2, 9.32, 9.52

[56] References Cited

U.S. PATENT DOCUMENTS

| | | | |
|---|---|---|---|
| 3,753,830 | 5/1973 | Talley | 180/9.5 |
| 3,869,010 | 3/1975 | Stedman | 180/9.5 |
| 4,763,742 | 8/1988 | Langford | 180/9.1 |
| 5,125,467 | 6/1992 | Mancheron | 180/6.48 |
| 5,337,846 | 8/1994 | Ogaki et al. | 180/8.2 |

FOREIGN PATENT DOCUMENTS 56-138071  3/1980  Japan .
63-203483  2/1987  Japan .

*Primary Examiner*—Michael Zanelli
*Attorney, Agent, or Firm*—Diller, Ramik & Wight

[57] ABSTRACT

This invention relates to the controlling of the travel of a crawler vehicle and aims at resolving the issue of making a crawler vehicle travel on an ungraded land with the crawlers effectively gripping the road surface. According to the present invention, the loads imparted to crawlers (12FL, 12FR, 12RL, 12RR) are detected, and, on the basis of the results of this detection, the sum of the loads on a pair of crawlers (12FL, 12RR) at the front left and rear right sides of the vehicle and the sum of the loads on another pair of crawlers (12FR, 12RL) at the front right and rear left sides thereof are computed. When a difference between the sums thus computed has become higher than a predetermined level, it means that a diagonal stuck has occurred. In such a case, the pivot shafts (14) of a pair of crawlers having smaller loads are driven in a direction in which the loads imparted to the same crawlers increase, so that the floated pair of crawlers contact the road surface, these crawlers thus being capable of providing an effective driving force. This invention is used mainly when a natural disaster rescue crawler vehicle travels on an outdoor ungraded land.

2 Claims, 4 Drawing Sheets

TRACTION CONTROLLER FOR CRAWLER VEHICLES

TECHNICAL FIELD

The present invention relates to a traction controller for crawler vehicles, and more particularly to a traction controller for crawler vehicles for controlling the travel of a crawler vehicle of a four-wheel track frame structure used for natural disaster rescue purposes or the like on an ungraded land with the crawlers effectively gripping the road surface.

BACKGROUND ART

When a so-called 4WD vehicle is made to sports-travel on an ungraded land where the road irregularities are large, there are cases where the load is concentrated on either pair of wheels of two pairs of wheels on two diagonal lines, and another pair of wheels idle and become stuck without being able to grip the road surface. This state is called a "diagonal stuck," and whether or not such a stuck state is brought about depends on the driving skill of the driver of the 4WD vehicle. In addition, once this diagonal stuck occurs, it is necessary to overcome the stuck state by such as using a winch, and much time and labor are required in overcoming it.

In addition, a crawler vehicle has been conventionally known from Japanese Patent Publication No. 270/1988, which has a 4-wheel track frame structure in which transverse pairs of crawlers are provided on the front and rear sides, respectively, of a vehicle body, and which travels as the driving of sprockets of the crawlers is controlled independently (hereafter, this crawler vehicle will be referred to as a 4-crawler vehicle).

Since such a 4-crawler vehicle is similar to the above-described 4WD vehicle in that the "four wheels" are driven, the aforementioned diagonal stuck may also occur when the 4-crawler vehicle travels on an ungraded land where the road irregularities are large.

However, the conventional 4-crawler vehicles are designed under the assumption that they are remote-controlled indoors and, even in the case of outdoors, on a flat land or on a road surface having small irregularities at most. Thus, there has been no design which assumes the occurrence of a diagonal stuck.

Accordingly, in the case of 4-crawler vehicles as well, whether or not the diagonal stuck can be prevented in advance depends on the skill of the driver (operator) in the same way as with the 4WD vehicles. In addition, if the 4-crawler vehicles are stuck, there is no other way than to overcome the stuck state by using a winch or the like.

However, as compared with the 4WD vehicles used mainly for leisure, the 4-crawler vehicles are frequently used for a natural disaster rescue purposes which have paramount urgency. For this reason, there has been a demand for reliably preventing the stuck state without resorting to the driving technique, and for requiring less time and trouble should the stuck state occur.

Here, in the case of wheel-type vehicles, an attempt has been made to obtain an effective driving force by causing the wheel floated from the road surface to contact the road surface by controlling the stroke of the suspension of each wheel.

However, the 4-crawler vehicle in terms of its structure has its four crawlers rotatable. For this reason, as compared with a 4WD vehicle which has a substantially uniform wheel size and in which variations in the distance from the vehicle body to the road surface are small, the variations in the distance are extremely large. Accordingly, the technique for controlling the stroke of the suspension cannot be adopted as it is in the light of restrictions in mechanical design and economic efficiency.

In addition, in the case of a 4WD vehicle, even if a diagonal stuck occurs, since the power of the engine is distributed and imparted to the four wheels via a drive shaft in the case of a normal 4WD vehicle, the engine is not overloaded although some wheels may idle.

With the 4-crawler vehicle, however, the four crawlers are respectively driven by a total of four independent motors, and these motors are controlled so that the number of revolutions becomes a targeted value. For this reason, when the drive load becomes large, control is provided such that the current for generating a torque is automatically increased to maintain the number of revolutions.

Here, in the selection of traveling driving motors, there is a demand that the capacity be cut down as practically as possible in the light of economic efficiency and dimensional restrictions. In other words, in calculating the capacity of a motor, it is premised that the total required power is uniformly distributed to the four crawlers, and leeway of several dozens percentage is additionally provided. However, when the 4-crawler vehicle is in the "diagonal stuck," and the floated pair of crawlers become unable to grip the ground surface, the weight of the vehicle body is applied to the other pair of crawlers alone. As can be apparent from a simple calculation, the traveling driving motor, whose capacity is originally selected to travel by bearing one fourth of the weight of the vehicle body, comes to bear half of the weight of the vehicle body. Therefore, a load torque current twice the rating flows across the motor, so that an overload of the motor or a motor power supply results. For this reason, the vehicle becomes unable to advance due to the burning of the motor or the actuation of a protective breaker, so that a time loss occurs, and it becomes impossible to speedily cope with an emergency situation.

The present invention has been devised in view of such actual situations, and its object is to provide a traction controller for a crawler vehicle capable of traveling reliably without a time loss due to a stuck state even in a situation requiring paramount urgency by preventing a diagonal stuck in advance and automatically.

DISCLOSURE OF THE INVENTION

Accordingly, in accordance with the present invention, there is provided a crawler vehicle in which transverse pairs of crawlers are provided on front and rear sides, respectively, of a vehicle body, and driving of sprockets of the crawlers is controlled independently, characterized by:

a track frame of each of the crawlers being disposed rotatably in forward and backward directions of the vehicle body by means of a pivot shaft;

load detecting means for detecting a load applied to each of the crawlers;

computing means for computing a sum of loads applied to a pair of crawlers on a front left side of the vehicle body and on a rear right side of the vehicle body and for computing a sum of loads applied to another pair of crawlers on a front right side of the vehicle body and on a rear left side of the vehicle body on the basis of results of detection by the load detecting means; and drive controlling means for controlling driving of each pivot shaft of the pair of crawlers whose sum of the loads is smaller of the two sums of the loads of the pairs in a direction in which the loads applied to the same pair of crawlers increase when a difference between the sums computed by the computing means becomes a predetermined value or more.

In such an arrangement, the load applied to each crawler is detected, and, on the basis of results of this detection, the sum of loads applied to a pair of crawlers on the front left side of the vehicle body and on the rear right side of the vehicle body is computed, and the sum of loads applied to another pair of crawlers on the front right side of the vehicle body and on the rear left side of the vehicle body is computed. Then, when the difference between the sums thus computed has become not lower than a predetermined level, it means that a diagonal stuck has occurred. In such a case, the driving of the pivot shafts of a pair of crawlers having smaller loads is controlled in a direction in which the loads imparted to the same crawlers increase, so that the floated pair of crawlers contact the road surface, these crawlers thus being capable of providing an effective driving force.

BRIEF DESCRIPTION OF THE DRAWINGS

FIGS. 2(a) to 2(e) are diagrams illustrating attitudes which can be assumed by the crawler vehicle in accordance with the embodiment, and are diagrams for explaining the flowchart shown in FIG. 1;

BEST MODE FOR CARRYING OUT THE INVENTION

Figure 1:
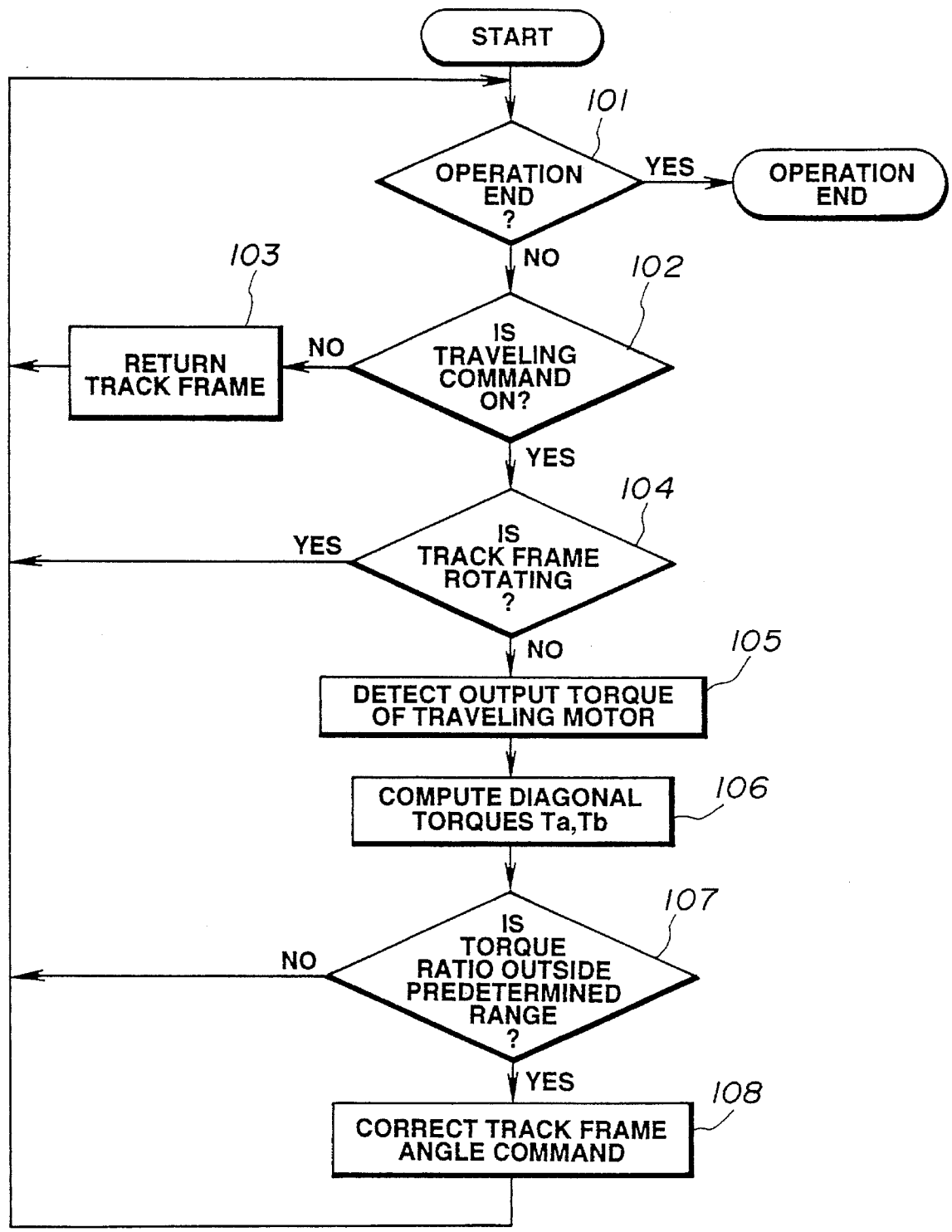
FIG. 1 is a flowchart illustrating a control procedure in an embodiment of a traction controller for a crawler vehicle in accordance with the present invention.

Referring now to the drawings, a description will be given of an embodiment of a traction controller for crawler vehicles in accordance with the present invention.

Figure 4:
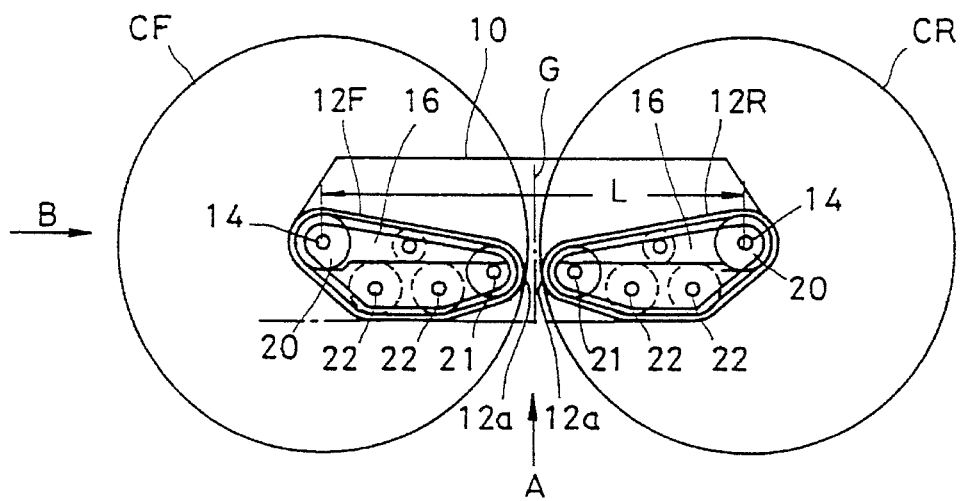
FIG. 4 is a side elevational view illustrating a side of the crawler vehicle in accordance with the embodiment.
Figure 5:
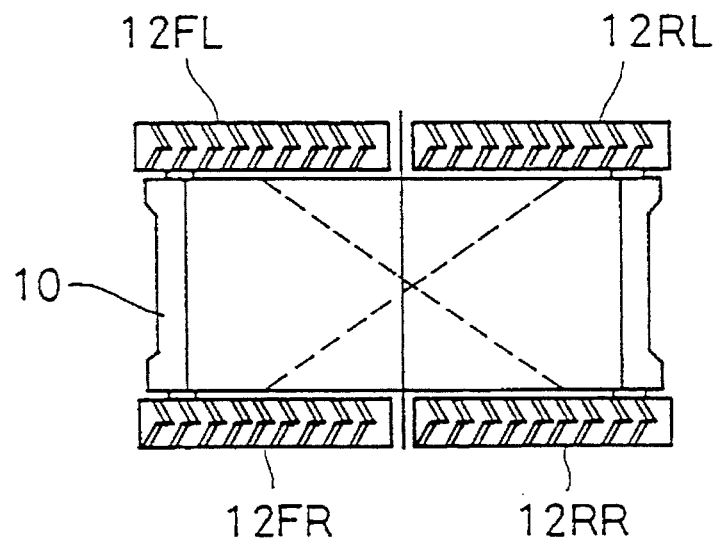
FIG. 5 is a bottom view taken in the direction of arrow A in FIG. 4.
Figure 6:
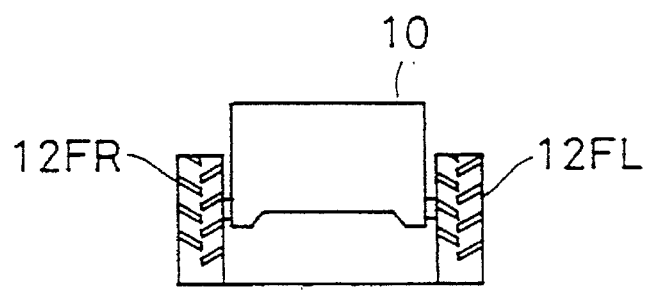
FIG. 6 is a front elevational view taken in the direction of arrow B in FIG. 4.

FIG. 4 is a side elevational view of a crawler vehicle in accordance with the embodiment; FIG. 5 is a bottom view taken in the direction of arrow A in FIG. 4; and FIG. 6 is a front elevational view taken in the direction of arrow B in FIG. 4.

As shown in these drawings, a transverse pair of front crawlers 12F and a transverse pair of rear crawlers 12R, which are rotatively driven by independent driving sources respectively, are disposed at four corners of the body of a crawler vehicle. Here, with respect to the front crawlers 12F, the left crawler as viewed in the direction of travel will be designated as 12FL, and the right crawler as viewed in the direction of travel will be designated as 12FR to distinguish between the two. Similarly, with respect to the rear crawlers 12R, the left crawler as viewed in the direction of travel will be designated as 12RL, and the right crawler as viewed in the direction of travel will be designated as 12RR to distinguish between the two.

A track frame 16 of each of the crawlers 12FL, . . . , is disposed on a vehicle body 10 by means of a pivot shaft 14 located coaxially with a rotating shaft of a drive sprocket 20, and each crawler 12FL, . . . , is rotatable 360° with the pivot shaft 14 serving as a rotational center. Here, the pivot shafts 14 are disposed at positions where arcs CF and CR of maximum rotation depicted by distal ends 12a of the crawlers 12F and 12R at the front and rear of the vehicle body do not overlap, i.e., at positions where the front and rear crawlers 12F and 12R do not interfere with each other. Namely, the crawler vehicle is designed so that a distance L between the pivot shafts 14 of the front and rear crawlers 12F and 12R is greater than the sum of radii of the arcs CF and CR of maximum rotation of the two crawlers 12F and 12R (see FIG. 4).

Further, the crawler vehicle is designed such that the center of gravity G of the vehicle body 10 passes an intermediate point between the arcs CF and CR of maximum rotation, so that ground contacting positions of the crawlers 12F and 12R are constantly located outside the center of gravity G.

It should be noted that, in FIG. 4, reference numeral 21 denotes an idler-side sprocket, and numeral 22 denotes a lower track roller. Since the crawlers 12FL, . . . , are rotatable as described above, if the crawler vehicle is made to assume a rotated attitude in which the distal ends 12a of the front and rear crawlers 12F and 12R are extended toward the front and the rear, respectively, of the vehicle body 10, a maximum length is obtained for the vehicle as a whole. On the other hand, if the crawler vehicle is made to assume another rotated attitude in which the distal ends 12a are oriented on the side of the center of gravity G of the vehicle body, a minimum length is obtained for the vehicle as a whole.

Figure 3:
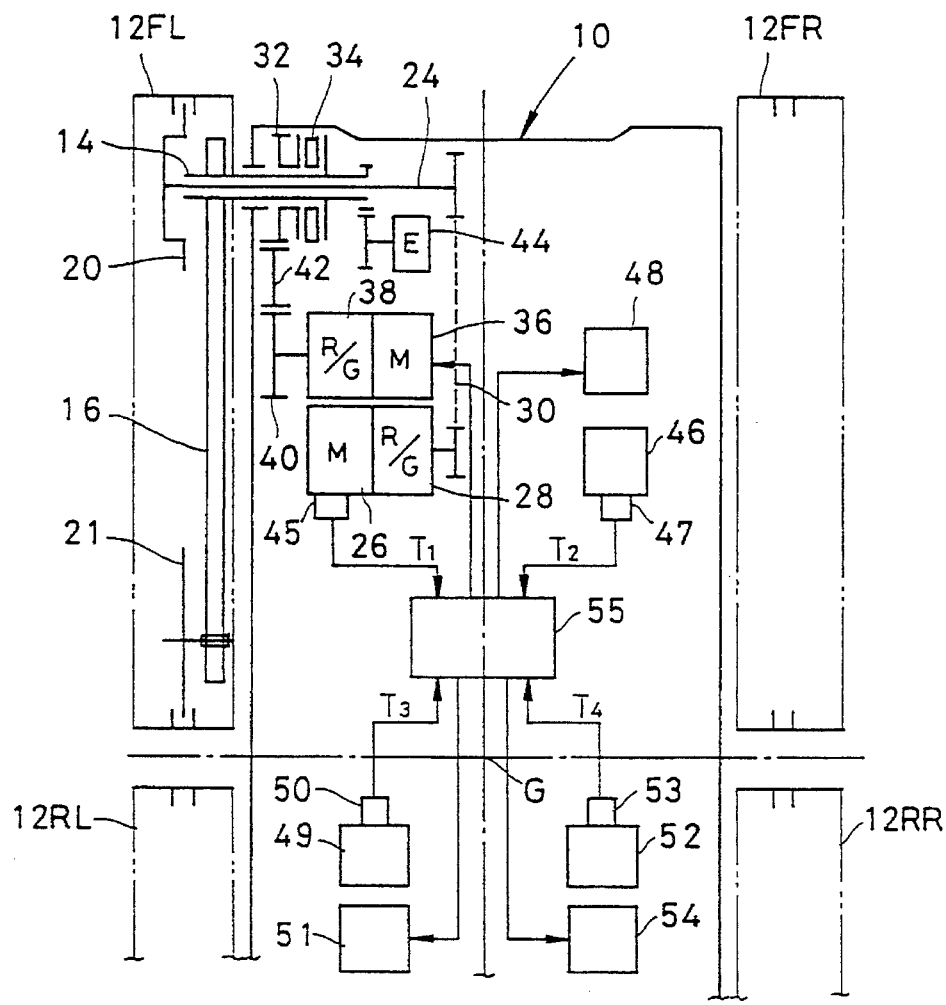
FIG. 3 is a diagram illustrating a rotating mechanism and a traveling mechanism of the crawler vehicle in accordance with the embodiment.

Driving mechanisms for the rotation and traveling of the crawlers 12FL, . . . , of such a crawler vehicle are shown in FIG. 3. It should be noted that since the mechanisms for driving the four crawlers 12FL, . . . , are identical mechanisms, only the mechanism for driving the front left crawler 12FL is illustrated in the drawing in a representative manner.

As shown in the drawing, a traveling motor 26 is a motor for rotating the crawler 12FL, and a driving force of the motor 26 is transmitted to a rotating shaft 24 of the drive sprocket 20 and the drive sprocket 20 via a reducer 28 and a chain 30. As a result, the crawler 12FL meshing with the sprocket 20 is rotated in such a manner as to travel around the outer periphery of the track frame 16 whereby the crawler vehicle travels. The traveling motor 26 is provided with a sensor 45 for detecting an output torque T1 of the motor 26, and the torque T1 detected by the sensor 45 is applied to a control device 55 which will be described later. It should be noted that the sensor 45 is sufficient if it is capable of detecting the load applied to the crawler 12FL, i.e., a ground-contacting state between the crawler 12FL and the road surface. For instance, if the motor 26 is a DC motor, it is possible to implement the detection of an armature current, and if the motor 26 is an AC servo motor, it is possible to implement the detection of an output signal of an AC servo amplifier. Alternatively, the torque applied to the crawler 12FL may be detected directly by a torque sensor.

Meanwhile, the pivot shaft 14 is a hollow cylindrical shaft which incorporates the rotating shaft 24, and the pivot shaft 14 is provided with an encoder 44 for detecting an angle of rotation, θ, of the shaft 14, i.e., the angle of rotation, θ, of the crawler 12F. The pivot shaft 14 is fixed to the track frame 16, and is rotatably supported by the vehicle body 10 by means of a bearing. A gear 32 is rotatably disposed on an outer peripheral surface of the pivot shaft 14, and a torque limiter 34 is integrally disposed on the peripheral surface of the pivot shaft 14. The torque limiter 34 acts to engage the gear 32 when the load acting on the pivot shaft 14 is smaller than a predetermined value, and to be disengaged from the gear 32 when the load is not less than the predetermined value.

The driving of a rotation motor 36 is controlled by the aforementioned control device 55, and rotates the track frame 16, i.e., the crawler 12FL. At this time, feedback control is provided by setting a value of detection by the encoder 44 so that the angle of rotation of the crawler 12FL becomes a desired angle. The driving force of the motor 36 is transmitted to the aforementioned gear 32 via a reducer 38, a drive gear 40, an intermediate gear 42. Here, in a normal case, the crawler 12FL is rotated in response to the rotation of the motor 36, but in the event that an excess rotational force is forcibly applied from the outside to the crawler 12FL due to a fall or the like, the engagement between the torque limiter 34 and the gear 32 is canceled, so that the rotational impact from the outside will not be transmitted directly to the power transmission mechanism between the gear 32 and the motor 36. For this reason, it is possible to obviate a situation in which the power transmission mechanism is damaged. In addition, since the encoder 44 is provided on the pivot shaft 14, even in the situation in which the power transmission mechanism is disengaged from the pivot shaft 14 by the rotational impact, it is possible to detect the angle of rotation, θ, of the crawler 12F. Since the details concerning such a mechanism are described in an earlier application (Japanese Patent Application No. 210922/1990) filed by the present applicant, and are not directly related to the gist of the present application, a further description thereof will be omitted.

The above-described driving mechanism is provided independently for each of the four crawlers 12FL, 12FR, 12RL, and 12RR to effect traveling and rotation individually. A traveling motor 46 for rotating the crawler 12FR is provided with a sensor 47 for detecting an output torque T2 of the motor 46, and the detected torque T2 is outputted to the control device 55. Similarly, a traveling motor 49 for rotating the crawler 12RL is provided with a sensor 50 for detecting an output torque T3 of the motor 49, and the detected torque T3 is outputted to the control device 55. Similarly, a traveling motor 52 for rotating the crawler 12RR is provided with a sensor 53 for detecting an output torque T4 of the motor 52, and the detected torque T4 is outputted to the control device 55.

The respective crawlers 12FR, 12RL, and 12RR are rotated by rotation motors 48, 51, and 54, and the driving of these rotation motors is controlled by the control device 55. It should be noted that the crawler vehicle is maneuvered by an unillustrated remote controller, and the driving of the traveling motors 26, 46, 49, and 52 is controlled so that the speed will become the speed operated and set by the remote controller. At the same time, the driving of the rotation motors 36, 48, 51, and 54 is controlled so that the angle of rotation operated and set by the remote controller will be obtained. However, since such a matter is not directly related to the invention of this application and is a matter relating to an earlier application (Japanese Patent Application No. 121296/1991) filed by the present applicant, a further description thereof will be omitted. In this embodiment, only the control device 55 for providing control relating to the invention of this application (hereafter this will be referred to as "traction control") is shown.

In the control device 55, processing shown in FIG. 1 is carried out. FIGS. 2(a) to 2(e) are diagrams illustrating the processing of FIG. 1, and illustrate "standard attitudes," attitudes which can be assumed by the crawler vehicle (FIGS. 2(a) and 2(b)), a fall warning attitude (FIGS. 2(c) and 2(d)), and a "bank climbing attitude" (FIG. 2(e)).

When the power of the control device 55 is turned on, the processing shown in FIG. 1 is started, and a determination is first made as to whether or not the crawler vehicle is being operated (Step 101). Here, if an emergency stop switch, an operation stop switch, or the like of the remote controller is operated, it is determined that the operation is to be ended immediately, so that the operating state ends (YES in the determination in Step 101). If it is not determined that the operation is to be ended (NO in the determination in Step 101), a determination is then made as to whether or not a traveling command with respect to the crawler vehicle is an on state (Step 102). Here, if a traveling stop command has been outputted from the remote controller, and the crawler vehicle is stopped (NO in the determination in Step 102), even if the crawler vehicle is in a diagonal stuck, since each traveling motor is not driven, the traveling motors are prevented from being overloaded due to a stuck state. Accordingly, traction control (Step 108), which will be described later, is effected for preventing a stuck state. Since the prevention of the overloads on the traveling motors is meaningless, the operation proceeds to Step 103 without performing such processing.

In Step 103, an operation is performed for returning the angle of rotation of the track frame 16 to a medium value. Namely, in the angle of rotation of each crawler 12FL, . . . , there is an angle at which the crawler is mechanically most unstrained for each attitude as shown as the "medium value" in FIG. 2. Accordingly, if the vehicle is at a standstill, the angle of rotation is returned to the medium value during this standstill, so as to prepare for traveling in a state in which no undue load is applied.

Meanwhile, if a traveling command has been outputted from the remote controller, and the crawler vehicle is traveling (YES in the determination in Step 102), there is a risk of the traveling motor becoming overloaded due to a diagonal stuck, so that the operation proceeds to an ensuing Step 104 to perform traction control for preventing the stuck state.

In Step 104, the detected value of the angle of rotation of each of the crawlers 12FL, . . . , is inputted (in the case of the crawler 12FL, the value θ detected by the encoder 44, for instance, is inputted). On the basis of this detected value, a determination is made as to whether or not each track frame 16 is being rotated. Here, if it is determined that any one of the track frames 16 is being rotated (YES in the determination in Step 104), this is a case in which control is being performed for changing the attitude of the crawler vehicle to another attitude. In addition, even if a diagonal stuck has occurred, the crawler vehicle can sometimes move out from the stuck state by the change in the attitude, so that the following traction control is not effected.

Meanwhile, if it is determined that all of the track frames 16 are not being rotated (NO in the determination in Step 104), this is a case in which the crawler vehicle is traveling while maintaining the same attitude, and there is the risk of lapsing into the diagonal stuck if no measure is taken. Accordingly, in order to prevent it, the torques T1, T2, T3, and T4 detected by the sensors 45, 47, 50, and 53 are inputted (Step 105). Then, with respect to the two crawlers 12FL and 12RR on a diagonal line as shown by the broken line in FIG. 5, the corresponding torques T1 and T4 are added, as shown by Ta in Formula (1) below. Similarly, with respect to the two crawlers 12FR and 12RL on another diagonal line, the corresponding torques T2 and T3 are added, as shown by Tb in Formula (1) below. These added values Ta and Tb will be hereafter referred to as the "diagonal torques."

$$Ta=T1+T4$$

$$Tb=T2+T3 \qquad (1) \text{ (Step 106)}$$

Then, a ratio between the two diagonal torques Ta and Tb computed in Step 106 above is determined, and if the following Formula (2) is satisfied, $$|Ta|/|Tb|<K, \text{ or } |Tb|/|Ta|<K \qquad (2)$$

That is, if |Ta|/|Tb| is smaller than a predetermined value K, or |Ta|/|Tb| is greater than a predetermined value 1/K, it is determined that the situation is such that the crawler vehicle is proceeding to a diagonal stuck (NO in the determination in Step 107).

On the other hand, if $$|Ta|/|Tb| \geq K, \text{ and } |Tb|/|Ta| \geq K \qquad (3)$$

That is, if |Ta|/|Tb| greater than or equal to the predetermined value K, and less than or equal to the predetermined value 1/K, it is determined that the situation is not such the crawler vehicle is proceeding to a diagonal stuck (YES in the determination in Step 107).

Incidentally, the value of the aforementioned predetermined value K is, for example, 0.8. It should be noted that this predetermined value K may be varied in correspondence with various states such as the attitude or the like being presently assumed by the crawler vehicle. Although, in Step 107, a determination is made by computing the ratio between the diagonal torques Ta and Tb, the computation is not limited to the ratio, and it suffices if the computation makes it possible to obtain the difference between the diagonal torques Ta and Tb.

If it is determined that the situation is such that the crawler vehicle is proceeding to a diagonal stuck, traction control, i.e., correction of the command of the angle of the track frame 16 is effected for obviating the diagonal stuck. Namely, with respect to two crawlers on a diagonal line where the diagonal torque is greater of the two diagonal torques Ta and Tb, the two crawlers are rotated toward upper limit values which can be allowed in the attitude being presently assumed by the crawler vehicle. Simultaneously, with respect to the other two crawlers on a diagonal line where the diagonal torque is smaller of the two diagonal torques Ta and Tb, the two crawlers are rotated toward lower limit values which can be allowed in the attitude being presently assumed by the crawler vehicle (see FIG. 2). Incidentally, if the crawler has presently reached the upper or lower limit value, the crawler is not rotated any further. Here, the direction in which the crawler is rotated differs depending on various attitudes.

Namely, in the case of traction control in the case of the standard attitude shown in FIG. 2(a), if it is assumed that the diagonal torque Ta is smaller than the diagonal torque Tb, the relevant crawler 12FL (12RR) is rotated clockwise so as to obtain effective traction for the crawler 12FL (12RR) corresponding to Ta. At the same time, the crawler 12RL (12FR) where the load is concentrated is rotated clockwise (see the arrow in FIG. 2(b)).

In addition, in the case of the fall warning attitude shown in FIG. 2(c), the crawler 12FL (12RR) is rotated counterclockwise in the opposite direction to that of the aforementioned standard attitude under the same conditions (see the arrow in FIG. 2(d)).

Figure 2E:
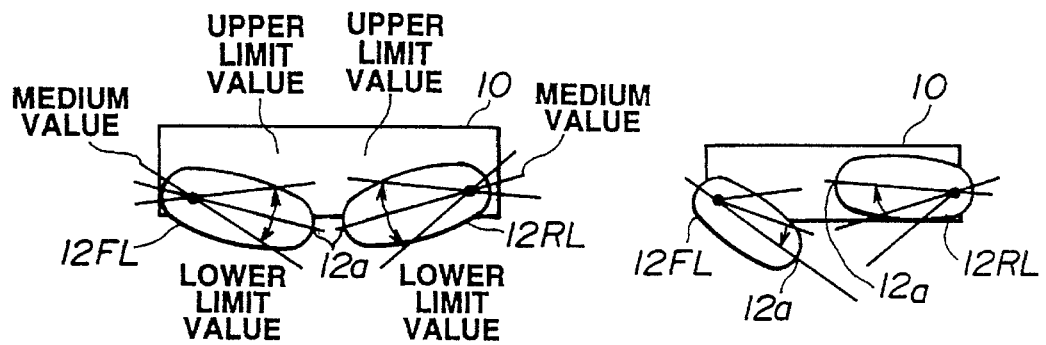
Figure 2E:
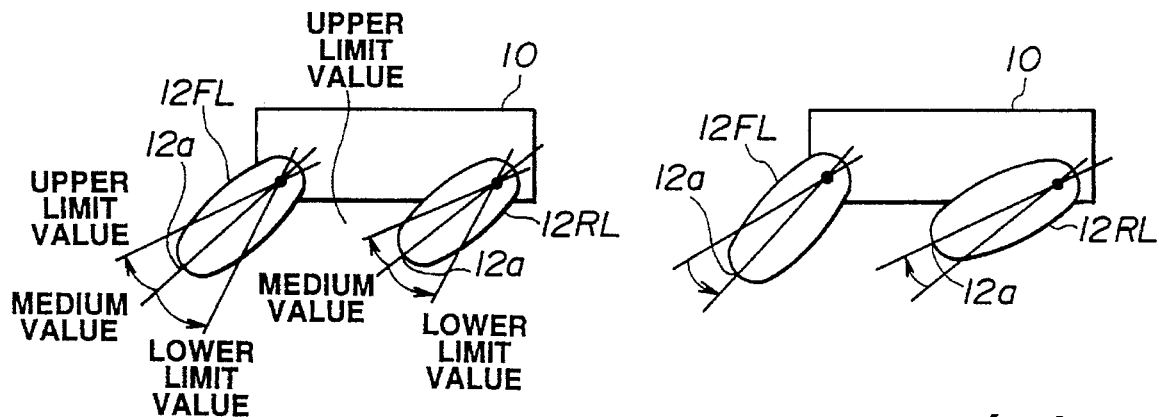
Figure 2E:
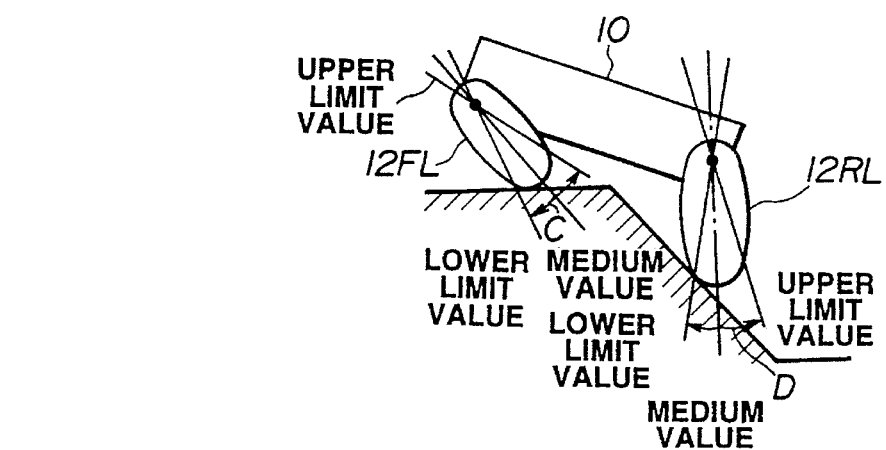

In addition, in the case of the bank climbing attitude shown in FIG. 2(e), the crawler 12RL (12FR) is rotated counterclockwise in the opposite direction to that of the aforementioned standard attitude under the same conditions (incidentally, the crawler 12FL (12RR) is rotated clockwise as indicated by arrow C).

Thus, since the direction of rotation of the crawler varies depending on various attitudes, the present attitude of the crawler vehicle is detected on the basis of the present angle of rotation, θ, and the direction of rotation is determined in correspondence with the results of this detection. In short, as for the direction of rotation (pivoting), it suffices if the crawler having a smaller load is rotated in a direction in which the load increases, and if the crawler having a larger load is rotated in a direction in which the load decreases.

Incidentally, the reason for the fact that the crawler not contacting the ground is rotated in a direction in which the crawler contacts the road surface, and, at the same time, the crawler contacting the ground is rotated in a direction in which the crawler is spaced apart from the road surface is because the angle of rotation per crawler can be reduced, and the response speed in control can be improved as a result.

In addition, as the mode of control, only the two crawlers whose diagonal torque has become smaller may be rotated (Step 108). Each time the operation proceeds to Step 108, the angle of rotation is corrected by a fixed angle on each occasion. The amount of this angular correction is, for example, a fixed value of a 0.5 degree, and each time the processing of Steps 101 to 108 in FIG. 1 is repeatedly executed, the angle of rotation is corrected by the angle 0.5° on each occasion in Step 108 until the diagonal stuck is obviated. However, it is possible to carry out the invention by varying the aforementioned amount of angular correction in correspondence with the present torque ratio (i.e., the difference between the diagonal torques Ta and Tb), the present attitude, or the like.

Since the above-described traction control is effected, the diagonal stuck of the crawler vehicle is prevented in advance and automatically, and a disaster rescue operation which has paramount urgency can be conducted speedily and reliably. In addition, it is possible to prevent a situation in which the traveling motors become overloaded, bringing the vehicle to a stop. Furthermore, since a load balance of the traveling motors is obtained automatically, it becomes unnecessary to provide large leeway in the capacity of the traveling motors in design, and it is possible to obtain an incidental advantage in that the crawler vehicle can be designed lightweight economically. As a result, by using large-capacity motors of a conventional level which are capable of withstanding overloads, leeway in torque which can be used in traveling is produced, so that it becomes possible to increase the running speed and increase a carrying load.

INDUSTRIAL APPLICABILITY

As described above, in accordance with the present invention, the diagonal stuck can be prevented in advance and automatically, and even in a situation requiring paramount urgency, the crawler vehicle is capable of traveling reliably without a time loss which is otherwise caused by the stuck state.

We claim:

1. A traction controller for a crawler vehicle in which transverse pairs of crawlers are provided on front and rear sides, respectively, of a vehicle body, and driving of sprockets of the crawlers is controlled independently, comprising:

a track frame of each of the crawlers is disposed rotatably in forward and backward directions of the vehicle body by means of a pivot shaft;

the traction controller includes:

load detecting means for detecting a load applied to each of the crawlers;

computing means for computing a sum of loads applied to a pair of crawlers on a front left side of the vehicle body and on a rear right side of the vehicle body and for computing a sum of loads applied to another pair of crawlers on a front right side of the vehicle body and on a rear left side of the vehicle body on the basis of results of detection by the load detecting means; and drive controlling means for controlling driving of each pivot shaft of the pair of crawlers whose sum of the loads is smaller of the two sums of the loads of the pairs in a direction in which the loads applied to the same pair of crawlers increase when a difference between the sums computed by the computing means becomes a predetermined value or more.

2. A traction controller for a crawler vehicle in which transverse pairs of crawlers are provided on front and rear sides, respectively, of a vehicle body, and driving of sprockets of the crawlers is controlled independently, comprising:

a track frame of each of the crawlers is disposed rotatably in forward and backward directions of the vehicle body by means of a pivot shaft;

the traction controller includes:

load detecting means for detecting a load applied to each of the crawlers;

computing means for computing a sum of loads applied to a pair of crawlers on a front left side of the vehicle body and on a rear right side of the vehicle body and for computing a sum of loads applied to another pair of crawlers on a front right side of the vehicle body and on a rear left side of the vehicle body on the basis of results of detection by the load detecting means; and drive controlling means for controlling driving of each pivot shaft of the pair of crawlers whose sum of the loads is smaller of the two sums of the loads of the pairs in a direction in which the loads applied to the same pair of crawlers increase, and for controlling driving of each pivot shaft of the pair of crawlers whose sum of the loads is greater of the two sums of the loads of the pairs in a direction in which the loads applied to the same pair of crawlers decrease when a difference between the sums computed by the computing means becomes a predetermined value or more.

* * * * *